No. 893,164. PATENTED JULY 14, 1908.
L. G. HAINES.
GRINDING ATTACHMENT FOR LAWN MOWERS.
APPLICATION FILED OCT. 2, 1907.
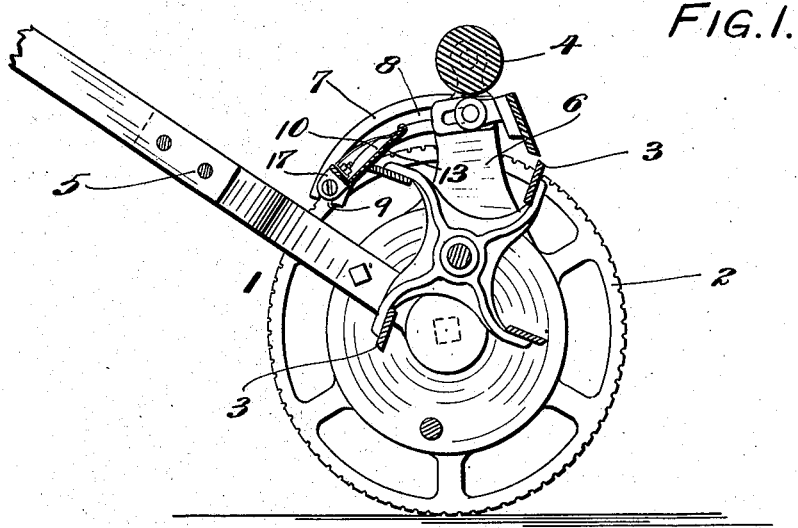
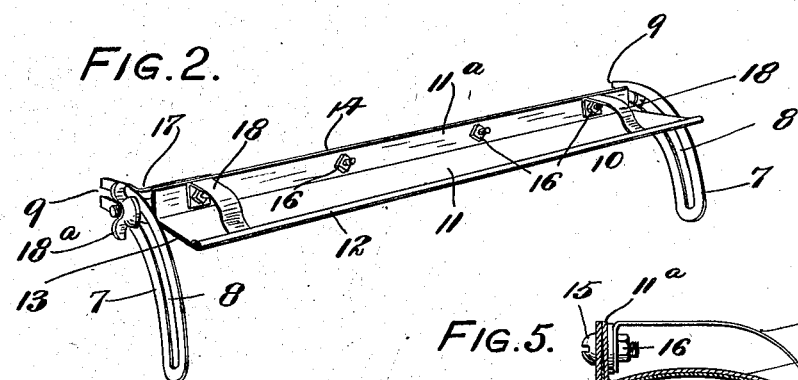
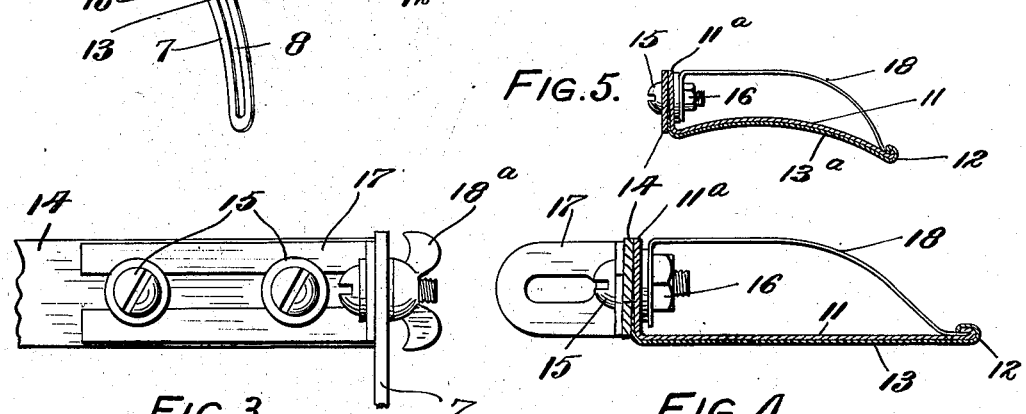
WITNESSES:
INVENTOR
Lawrence G. Haines,
BY
William B. Jackson,
ATTORNEY.

UNITED STATES PATENT OFFICE.

LAWRENCE G. HAINES, OF GLASSBORO, NEW JERSEY.

GRINDING ATTACHMENT FOR LAWN-MOWERS.

No. 893,164.

Specification of Letters Patent.

Patented July 14, 1908.

Application filed October 2, 1907. Serial No. 395,651.

To all whom it may concern:

Be it known that I, LAWRENCE G. HAINES, a citizen of the United States, residing at Glassboro, in the county of Gloucester and State of New Jersey, have invented certain new and useful Improvements in Grinding Attachments for Lawn-Mowers, of which the following is a specification.

This invention relates to devices for sharpening lawn mowers and analogous machines of the type in which a rotary knife is used, and the principal object of the invention is to provide an improved sharpening device for the rotary knife of such machines which may be readily applied to the frame of the machine and removed therefrom, and which is used to sharpen the blades of the rotary knife only by reversing the movement of the rotary knife when the machine is not in actual use.

A further object of the invention is to provide simple, inexpensive and efficient means whereby the rotary knives of a mower may be sharpened by a person unskilled in such work.

A still further object is to employ means which is ordinarily detached from the mower and is only applied thereto when it is desired to sharpen the rotary blades.
A still further object is to provide means whereby as the blades revolve backward, the heel of the knives come in contact with the abrading surface of the device, thus producing an exceedingly keen edge.
Other objects will appear hereinafter.

The invention consists of the improvements hereinafter described and eventually claimed.

The nature, characteristic features and scope of the invention will be more fully understood from the following description taken in connection with the accompanying drawings forming part thereof, and in which Figure 1, is a view principally in section of a lawn mower having the attachment of the invention supplied thereto and illustrating one mode of using a mower so as to reverse the usual motion of the cutting blades. Fig. 2, is a perspective view of the attachment embodying the invention. Fig. 3, is a fragmentary view of a portion of the attachment.
Fig. 4, is a view principally in section of the attachment, and Fig. 5, is a similar view of a modified form of the invention.

Referring to the drawings, 1, represents a lawn mower having driving wheels 2, rotary blades 3, roller 4, and handle 5, all of which may be of any preferred construction. Having adjustable relation with the frame 6, that supports the roller 4, are curved arms or brackets 7, slotted as at 8, and provided with open ends 9. These arms after being properly adjusted may be secured to place and left upon the mower. Adapted to be attached to and detached from these arms or brackets is a rectangular attachment 10, capable of adjustment with respect to the slotted arms or brackets in a manner to be hereinafter described. This rectangular attachment 10, as shown, comprises a resilient metallic angular plate 11—11$^a$, preferably of tin, which may have a channeled edge 12. Applied to the part 11, of this angular plate, preferably by gluing, is a sheet of emery cloth or other suitable abrading material 13.
As shown in the drawings, this material 13, is secured at one end within the channel portion 12, and its other end is secured by means of a plate 14, which extends along the part 11$^a$, of the angular plate and which is secured thereto by means of screws 15 and nuts 16. Having slidable relation with the attachment and more particularly with respect to the plate 14, are slotted angular brackets 17, which are secured to place by means of the aforesaid screws and nuts 15 and 16. This adjustment is essential in order to accommodate the attachment to various sizes of mowers.

In order to provide stability to the attachment, leaf-springs 18, are provided at each end of the attachment one end of said springs being accommodated within the channel portion 12 of the plate 11, the opposite ends of the springs being secured to the plate 11$^a$, as shown, by means of the screws and nuts 15 and 16. In practice the brackets 7, as before described may be permanently attached to the mower and the brackets 17, together with the sharpening attachment and the butter-fly nuts 18$^a$, used for positioning the same, may be readily adjusted with respect to the slotted arms or brackets, access to the arms being had by virtue of the open ends 9.

The attachment is adjusted upon the mower when it is desired to sharpen the rotary blades 3, and is so arranged that as the blades revolve in a backward or reverse motion to that ordinarily used in cutting grass, the heel of the knives come in contact with the abrading surface 13, of the attachment 10, and thus produces a very keen cutting edge. By reason of the somewhat resilient character of the attachment 10, the blades contact with the same with a more or less slight pressure, and by reason thereof, the blades are not unduly worn. In the modification shown in Fig. 5, the abrading surface 13a, is curved inwardly which permits of the blades 3, contacting through a greater arc in their rotation which obviously provides a larger abrading surface, which is advantageous.

In practice it has been demonstrated that very good results have been obtained by sharpening the blades of a mower by revolving the blades backward. This method has been found necessary for the following reason: In rotating the blades in their ordinary direction, the cutting edge of the blades contact with the abrading surface and tends to round off, as it were, the cutting edge of the blade in contradistinction from producing the keen edge necessary to produce a clean cut rather than a tearing cut. By reversing the ordinary direction of rotation of the blades, the heel of the blades contact with the abrading surface first and as the blades further rotate, the bevel of the knives are drawn across the abrading surface and gradually effect a keen razor-like cutting edge. The mode of obtaining a reverse movement of the cutting blades depends entirely upon the make of lawn mower, and will be readily understood by those skilled in the art. However, the following explanation may tend toward a better understanding of the application of the attachment of the invention.

In some instances, the pawl in the small pinion that derives its motion from the main driving wheel and rotates the cutting blades of the machine may be reversed, the attachment put in place and the mower turned to the position shown in Fig. 1, and by pushing the same along the ground for a short time will cause the blades to be sharpened whereupon the attachment may be removed, the pawl returned to its original position and the mower used in the ordinary manner. Some makes of mowers are provided with an extension upon the blade shaft for the reception of a crank. In this event, the mower may be lifted free of the ground, the attachment applied and the rotary blades revolved in a backward motion by means of said crank. It may be necessary in still other makes of mowers to resort to other means in order to obtain a reverse movement of the cutting blades, but this is not essential to this invention.

Having thus described the nature and objects of the invention, what I claim as new and desire to secure by Letters Patent is:

1. The combination in a lawn mower of a sharpening device for the rotary knives thereof comprising a resilient plate having an abrading surface and laterally adjustable members, reinforcing members for said plate, adjustable brackets carried by the frame of the machine, means for adjustably securing the aforesaid members with respect to said brackets, and means for causing the rotary blades of the mower to impinge against the abrading surface in a reverse or backward direction.

2. The combination in a lawn mower of a sharpening device for the rotary knives thereof comprising a resilient plate having an abrading surface and laterally adjustable angle brackets, reinforcing members for said plate arranged at each end thereof, adjustable arms carried by the frame of the mower, the aforesaid brackets being adjustably secured to said arms, and adapted for adjustable travel with respect thereto and means for causing the rotary blades to unhinge against said abrading surface in a reverse or backward rotation.

3. An attachment for lawn mowers comprising an angular member having a removable abrading surface, brackets adjustably mounted in relation to said member, leaf springs at each end of the device for reinforcing the angular member and means for securing the springs to place.

4. An attachment for lawn mowers comprising an angular member having a channeled edge and an inverted curved abrading surface, angular brackets adjustably mounted in relation to said member, and leaf springs at each end of the device, one end of said springs being secured to the angular member and the free ends of said springs being inserted within the channeled portions of the device.

5. A sharpening attachment for lawn mowers comprising a resilient plate having an inverted and curved abrading surface and reinforcing members for the plate at each end thereof.

6. A sharpening attachment for lawn mowers comprising a resilient plate provided with a sheet of abrading material and having angle brackets laterally adjustable with respect to the plate, means for reinforcing said resilient plate, side arms carried by the frame of the mower and adapted for concentric adjustment with respect to the rotary blades of the mower and means for adjustably securing the angle brackets to the side arms.

7. A sharpening attachment for lawn mowers comprising a comparatively thin angle plate provided with a removable sheet of abrading material and reinforcing members for the said plate at each end thereof.

8. A sharpening attachment for lawn mowers comprising a resilient plate having a channeled edge and an angular extension and reinforcing members at each end of the said plate, one of the ends of said reinforcing members being secured to the angular extension and the free ends thereof being inserted within the channeled edge of the plate.

In testimony whereof I have hereunto set my hand.

LAWRENCE G. HAINES.

Witnesses:
Wm. J. Jackson,
Grant C. Osborne.